United States Patent Office 3,043,832
Patented July 10, 1962

3,043,832
PREPARATION OF 6α-METHYL-17α-HYDROXY-PROGESTERONE AND 17α-ESTERS THEREOF
Pietro de Ruggieri and Carlo Ferrari, Milan, Italy, assignors to Ormonoterapia Richter S.p.A., Milan, Italy, a corporation of Italy
No Drawing. Filed Apr. 28, 1961, Ser. No. 106,165
Claims priority, application Italy Feb. 27, 1961
4 Claims. (Cl. 260—239.55)

The present invention relates to the preparation of compounds represented by the formula

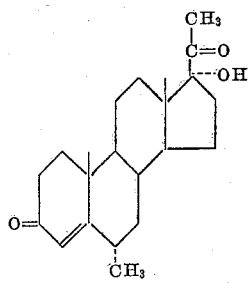

wherein R is hydrogen or an acyl radical derived from aliphatic carboxylic acid having 2–7 carbon atoms, which have high progestative activity in the human and veterinary field. As starting material, 3β-acetoxy-5α,6α-oxide-17β-cyan-17α-(2'- tetrahydropyranyloxy)-androstane (see copending application Serial No. 763,799, filed September 29, 1958, now Patent No. 2,996,502) has been selected.

This compound upon treatment with methyl magnesium bromide or iodide yields, after decomposition of the 20-ketimine with boiling aqueous solution of ammonium chloride, the oily 6β-methyl-17α-(2'-tetrahydropyranyloxy)-pregnane-3β,5α-diol-20-one. This, when hydrolyzed with an acid such as hydrochloric, sulfuric or p-toluenesulfonic acid, yield 6β-methyl-pregnane-3β,5α-17α-triol-20-one. However if treated with aluminum isopropoxide or t-butoxide and cyclohexanone in boiling toluene, the intermediate tetrahydropyranyl ether yields 6α-methyl - 17α - methyl-17α-(2'-tetrahydropyranyloxy)-4-pregnene-3,20-dione.

This compound, when hydrolyzed with an acid such as hydrochloric, sulfuric or p-toluenesulfonic acid, yields 6α-methyl-4-pregnene-17α-ol-3,20-dione but when treated with aliphatic carboxylic acids having 2–7 carbon atoms or their anhydrides in the presence of catalytic amounts of p-toluenesulfonic acid, it yields the corresponding 17α-acyloxy-derivative of 6α-methyl-4-pregnene-17α-ol-3,20-dione. The following examples are given to further illustrate the products and the process of the present invention, and are not to be construed as limiting.

EXAMPLE 1

6β - Methyl-17α-(2' - Tetrahydropyranyloxy) Pregnane-3β,5α-Diol-20-One and 6β-Methyl-Pregnane-3β,5α,17α-Triol-20-One A solution of 1.0 part of 3β-acetoxy-5α,6α-oxide-androstane-17β-cyan-17α-(2'-tetrahydropyranyloxy) in 30 parts of anisole was treated with 50 parts of an ethereal solution of methyl magnesium bromide (from 3.3 parts of magnesium).

The ether was removed and the mixture kept at 90–95° C. for 16 hours. After decomposition with 100 parts of ice cooled 10% ammonium chloride aqueous solution, the mixture was refluxed for 15 minutes; then, after ethereal extraction, the solvent was removed to dryness in vacuo. The oily residue, which resisted crystallization attempts, showed I.R. bands at 2.90µ (free hydroxyl), 5.85µ (20-keto), and 10.16, 11.45µ (pyranyl-ether).

A sample, boiled for 15 minutes in acetone with a drop of dilute hydrochloric acid, gave 6β-methyl-pregnane-3β,5α,17α-triol-20-one M.P. 247–249° C., $[\alpha]_D$—34° (Chf.); I.R. bands: 2.90µ (hydroxyl), 5.88µ (20-keto).

EXAMPLE 2

6α - Methyl-17α-(2'- Tetrahydropyranyloxy)-4-Pregnene-3,20-Dione and 6α-Methyl - 4 - Pregnene-17α-Ol-3,20-Dione 1.2 parts of 6β-methyl-17α-(2'-tetrahydropyranyloxy)-pregnane-3β,5α-diol-20-one were dissolved in 35 parts of toluene and 10 parts of cyclohexanone 2.4 parts of aluminum isopropoxide, dissolved in 24 parts of toluene, were added and the mixture was refluxed for 1 hour. After cooling, 60 parts of Rochelle salt in 90 parts of water were added, the aqueous phase was decanted and the organic phase was steam-distilled until the solvent was completely eliminated. The remaining aqueous suspension was repeatedly extracted with diethyl ether and the combined extracts, after drying over sodium sulfate, were concentrated to dryness. The residue was dissolved in benzene and filtered through a short column filled with 10.0 parts of aluminum oxide. The oily residue, obtained after solvent elimination, was crystallized from aqueous methanol to give 6α-methyl-17α-(2'-tetrahydropyranyloxy)-4-pregnene-3,20-dione M.P. 138–143° C., $[\alpha]_D+72°$ (acetone); I.R. bands: 5.88µ (20-keto); 6.01, 6.25µ (3-keto-$\Delta^4$), 10.16, 11.45µ (pyranyl-ether).

A sample boiled for 15 minutes in acetone with a drop of dilute hydrochloric acid, gave 6α-methyl-4-pregnene-17α-ol-3.20-dione M.P. 218–222° C., $[\alpha]_D+73°$ (Chf.);

$$\lambda_{max.}^{EtOH}\ 241\ m\mu\ (16,000)$$

I.R. bands: 2.90µ (free hydroxyl), 5.97µ (20-keto), 6.01, 6.25µ (3-keto-$\Delta^4$).

EXAMPLE 3

6α-Methyl-17α-Acetoxy-4-Pregnene-3.20-Dione 20 parts of the 6α-methyl-17α-(2'-tetrahydropyranyloxy)-4-pregnene-3,20-dione were dissolved in 20 parts of pure acetic acid and 0.15 part of p-toluenesulfonic acid were added.

The mixture was refluxed for 6 hours, then cooled and diluted with water.

After extraction with diethylether, the organic phase was washed with 2 N aqueous solution of $Na_2CO_3$ and water, dried over $Na_2SO_4$ and concentrated in vacuo to dryness. Crystallization from methanol gave 6α-methyl-17α - acetoxy-4-pregnene-3,20-dione M.P. 207–209° C., $[\alpha]_D+61°$ (Chf.)

$$\lambda_{max.}^{EtOH}\ 240\ m\mu\ (15,900)$$

I.R. bands: 5.78, 8.01µ (17α-acetoxy), 5.88µ (20-keto), 6.01, 6.22µ (3-keto-$\Delta^4$).

EXAMPLE 4

6α-Methyl-17α-Hexanoyloxy-4-Pregnene-3,20-Dione 2.0 parts of 6α-methyl-17α-(2'-tetrahydropyranyloxy)-4-pregnene-3,20-dione were dissolved in 20 parts of caproic anhydride and 0.15 part of p-toluenesulfonic acid were added. The mixture was kept at 110° C. for 16 hours, then diluted with water containing a few drops of pyridine and steam-distilled until the solvent was completely eliminated. The aqueous suspension was repeatedly extracted with diethyl ether and the ether, after drying over sodium sulfate, was completely evaporated. The residue after chromatography gave the oily 6α-methyl-17α-hexanoyloxy - 4 - pregnene 3,20-dione, $[\alpha]_D+54°$ (Chf.);

$$\lambda_{max.}^{EtOH}\ 240\ m\mu\ (15,700)$$

I.R. bands; 5.78, 8.12μ (17α-hexanoyloxy), 5.85μ (20-keto); 6.01, 6.23μ (3-keto-Δ⁴).

EXAMPLE 5

*6α-Methyl-17α-Heptanoyloxy-4-Pregnene-3,20-Dione*

The compound was obtained as described in Example 4, using, oenanthic anhydride instead of caproic anhydride. Oily, [α]$_D$+51° (Chf.)

$\lambda_{max.}^{EtOH}$ 240 mμ (15,100)

I.R. Bands: 5.78, 8.15μ (17α-heptanoyloxy); 5.85μ (20-keto). 6.01, 6.25μ (3-keto-Δ⁴).

It is to be understood that the invention is not to be limited to the exact details or exact compounds shown and described, as obvious modifications and equivalents will be apparent to one skilled in the art, and the invention is therefore to be limited only by scope of the appended claims.

We claim:

1. 6β - Methyl - 17α - (2'-tetrahydropyranyloxy)-pregnane-3β,5α-diol-20-one.

2. 6α - Methyl-17α-(2' - tetrahydropyranyloxy)-4-pregnene-3,20-dione.

3. A method of preparing 6β-methyl-4-pregnene-17α-ol-3,20-dione comprising reacting 3β-acetoxy-5α,6α-oxide-17β-cyan-17α-(2'-tetrahydropyranyloxy)-androstane with a methyl magnesium halide selected from the group consisting of methyl magnesium bromide and methyl magnesium iodide, decomposing the reaction product with ammonium chloride to yield 6β-methyl-17α-(2'-tetrahydropyranyloxy)-pregnane - 3β,5α - diol-20-one, oxidizing said last-named compound with cyclohexanone and an aluminum alkoxide selected from the group consisting of aluminum isopropoxide and aluminum t-butoxide, and treating the resulting 6α-methyl - 17α - (2'-tetrahydropyranyloxy)-4-pregnene-3,20-dione with an acid selected from the group consisting of hydrochloric acid, sulfuric acid and p-toluenesulfonic acid to yield 6α-methyl-4-pregnene-17α-ol-3,20-dione.

4. A method of preparing compounds of the formula

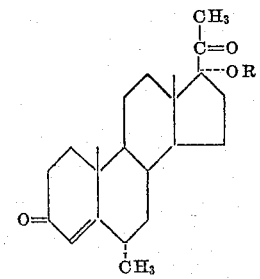

wherein R is an acyl radical derived from an aliphatic carboxylic acid having 2–7 carbon atoms, comprising reacting 3β - acetoxy-5α,6α-oxide-17β-cyan-17α-(2'-tetrahydropyranyloxy)-androstane with a methyl magnesium halide selected from the group consisting of methyl magnesium bromide and methyl magnesium iodide, decomposing the reaction product with ammonium chloride to yield 6β-methyl-17α-(2'-tetrahydropyranyloxy)-pregnane-3β,5α-diol-20-one, oxidizing said last-named compound with cyclohexanone and an aluminum alkoxide selected from the group consisting of aluminum isopropoxide and aluminum t-butoxide, and treating the resulting 6α-methyl-17α-(2'-tetrahydropyranyloxy)-4-pregnene 3,20 - dione with a compound selected from the group consisting of an aliphatic carboxylic acid having 2–7 carbon atoms and an anhydride thereof in the presence of catalytic amounts of p-toluenesulfonic acid to obtain the corresponding 17α-acyloxy derivative of 6α-methyl-4-pregnene-17α-ol-3,20-dione.

References Cited in the file of this patent

UNITED STATES PATENTS

| | | |
|---|---|---|
| 2,753,360 | Kaspar et al. | July 3, 1956 |
| 2,889,342 | Loken | June 2, 1959 |
| 2,892,833 | Miramontes et al. | June 30, 1959 |
| 2,959,585 | Ruggieri et al. | Nov. 8, 1960 |

OTHER REFERENCES

Babcock et al.: J.A.C.S., 80, 2904–2905 (1958).
Ruggieri et al.: J.A.C.S., 81, 5725–27 (1959).

UNITED STATES PATENT OFFICE
CERTIFICATE OF CORRECTION

Patent No. 3,043,832                               July 10, 1962

Pietro de Ruggieri et al.

It is hereby certified that error appears in the above numbered patent requiring correction and that the said Letters Patent should read as corrected below.

Column 1, lines 13 to 24, the formula should appear as shown below instead of as in the patent:

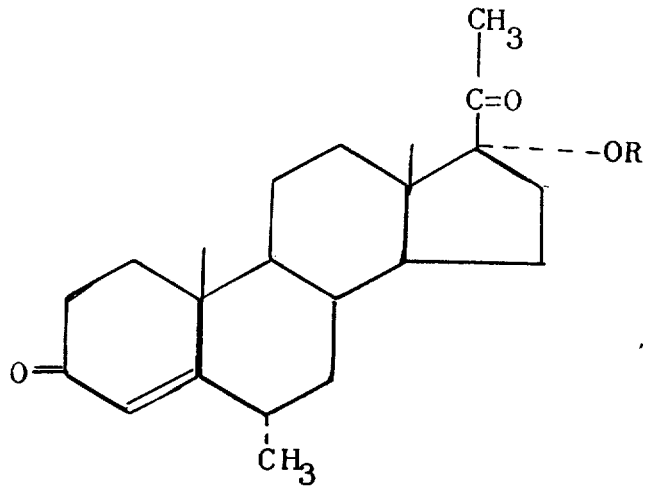

Signed and sealed this 11th day of December 1962.

(SEAL)
Attest:
ERNEST W. SWIDER
Attesting Officer

DAVID L. LADD
Commissioner of Patents